United States Patent
Wei

(10) Patent No.: US 8,228,538 B2
(45) Date of Patent: Jul. 24, 2012

(54) PERFORMANCE OF A LOCKED PRINT ARCHITECTURE

(75) Inventor: Ke Wei, Cupertino, CA (US)

(73) Assignee: Ricoh Company, Ltd., Tokyo (JP)

( * ) Notice: Subject to any disclaimer, the term of this patent is extended or adjusted under 35 U.S.C. 154(b) by 952 days.

(21) Appl. No.: 12/144,549

(22) Filed: Jun. 23, 2008

(65) Prior Publication Data

US 2009/0316183 A1 Dec. 24, 2009

(51) Int. Cl.
*G06F 3/12* (2006.01)
(52) U.S. Cl. .............. 358/1.15; 358/1.13; 358/1.14; 709/201; 709/202; 709/203; 719/330; 345/156
(58) Field of Classification Search ............... 358/1.15, 358/1.14, 1.13; 719/330; 345/156; 709/201, 709/202, 203
See application file for complete search history.

(56) References Cited

U.S. PATENT DOCUMENTS

| | | | |
|---|---|---|---|
| 5,633,932 A | 5/1997 | Davis et al. |
| 5,845,066 A | 12/1998 | Fukuzumi |
| 5,880,447 A | 3/1999 | Okada et al. |
| 6,131,126 A | 10/2000 | Kougiouris et al. |
| 6,735,665 B1 | 5/2004 | Kumagai et al. |
| 6,880,124 B1 | 4/2005 | Moore |
| 6,973,671 B1 | 12/2005 | Hsing et al. |
| 7,002,703 B2 | 2/2006 | Parry |
| 7,079,269 B2 | 7/2006 | Teeuwen et al. |
| 7,170,623 B2 | 1/2007 | Matoba et al. |
| 7,213,098 B2 | 5/2007 | Czajkowski et al. |
| 7,224,477 B2 | 5/2007 | Gassho et al. |
| 7,359,076 B2 | 4/2008 | Uchino |
| 7,450,260 B2 | 11/2008 | Takeda et al. |
| 7,667,865 B2 | 2/2010 | Ciriza et al. |
| 2001/0029521 A1 | 10/2001 | Matsuda et al. |
| 2001/0038462 A1 | 11/2001 | Teewen et al. |
| 2002/0002503 A1 | 1/2002 | Matsuoka |
| 2002/0021902 A1 | 2/2002 | Hosoda et al. |
| 2002/0023143 A1 | 2/2002 | Stephenson et al. |

(Continued)

FOREIGN PATENT DOCUMENTS

EP 1 229 724 A2 8/2002

(Continued)

OTHER PUBLICATIONS

European Patent Office, "European Search Report", EP application No. EP 07252112, dated Mar. 1, 2010, 6 pages.

(Continued)

*Primary Examiner* — Jacky X Zheng
(74) *Attorney, Agent, or Firm* — Hickman Palermo Truong Becker Bingham Wong LLP; Daniel D. Ledesma

(57) ABSTRACT

Techniques are provided for processing a job, such as a print job or a facsimile (fax) job. A printing device comprises multiple modules that are developed in different programming languages. An inter-process communication channel is established between (a) a first module that is developed in a platform-independent programming language and (b) a second module that is developed in a platform-dependent programming language. The first module receives user input that identifies a particular print job. In response to the user input, the first module sends, via the inter-process communication channel, one or more instructions to the second module, which retrieves the print job, decrypts the print job, and causes the print job to be executed.

22 Claims, 4 Drawing Sheets

U.S. PATENT DOCUMENTS

| | | |
|---|---|---|
| 2002/0041394 A1 | 4/2002 | Aoki |
| 2002/0059322 A1 | 5/2002 | Miyazaki et al. |
| 2002/0120855 A1 | 8/2002 | Wiley et al. |
| 2003/0044009 A1 | 3/2003 | Dathathraya |
| 2003/0090696 A1 | 5/2003 | Willis et al. |
| 2003/0090697 A1 | 5/2003 | Lester et al. |
| 2004/0019671 A1 | 1/2004 | Metz |
| 2004/0056889 A1 | 3/2004 | Katano |
| 2004/0088378 A1 | 5/2004 | Moats |
| 2004/0090652 A1 | 5/2004 | Yoon |
| 2004/0095595 A1* | 5/2004 | Jacobsen .................. 358/1.14 |
| 2004/0118911 A1 | 6/2004 | Black et al. |
| 2004/0125402 A1 | 7/2004 | Kanai et al. |
| 2004/0140611 A1 | 7/2004 | Mui et al. |
| 2004/0196492 A1 | 10/2004 | Johnson et al. |
| 2004/0239992 A1 | 12/2004 | Kawai et al. |
| 2004/0257601 A1 | 12/2004 | Tomiyasu et al. |
| 2004/0257613 A1 | 12/2004 | Okabe et al. |
| 2004/0263870 A1 | 12/2004 | Itoh et al. |
| 2005/0039044 A1 | 2/2005 | Gassho et al. |
| 2005/0046876 A1 | 3/2005 | Burget et al. |
| 2005/0068547 A1 | 3/2005 | Negishi et al. |
| 2005/0094195 A1 | 5/2005 | Sakamoto et al. |
| 2005/0141013 A1 | 6/2005 | Kikuchi et al. |
| 2005/0149744 A1 | 7/2005 | Sydir et al. |
| 2005/0152543 A1 | 7/2005 | Shima et al. |
| 2005/0154884 A1* | 7/2005 | Van Den Tillaart .......... 713/165 |
| 2005/0168769 A1 | 8/2005 | Kim et al. |
| 2005/0182508 A1 | 8/2005 | Niimi et al. |
| 2005/0182822 A1 | 8/2005 | Daniel et al. |
| 2005/0183141 A1 | 8/2005 | Sawada |
| 2005/0210253 A1 | 9/2005 | Shigeeda |
| 2005/0213136 A1 | 9/2005 | Noyama et al. |
| 2005/0229189 A1* | 10/2005 | McManus ................... 719/330 |
| 2005/0268089 A1 | 12/2005 | Kim et al. |
| 2005/0273843 A1 | 12/2005 | Shigeeda |
| 2005/0273852 A1 | 12/2005 | Ferlitisch |
| 2005/0276618 A1 | 12/2005 | Clement et al. |
| 2006/0044589 A1 | 3/2006 | Nakagawaji |
| 2006/0112270 A1 | 5/2006 | Erez |
| 2006/0268315 A1 | 11/2006 | Randt |
| 2006/0279760 A1 | 12/2006 | Wang et al. |
| 2006/0279761 A1* | 12/2006 | Wang et al. .................. 358/1.14 |
| 2006/0279768 A1 | 12/2006 | Wang et al. |
| 2007/0139695 A1 | 6/2007 | Young et al. |
| 2007/0177920 A1 | 8/2007 | Katano et al. |
| 2008/0066185 A1 | 3/2008 | Lester et al. |
| 2008/0114922 A1 | 5/2008 | Chou et al. |
| 2008/0189598 A1 | 8/2008 | Yoshida |
| 2008/0201784 A1 | 8/2008 | Someshwar |
| 2009/0147698 A1 | 6/2009 | Potvin |
| 2009/0185223 A1 | 7/2009 | Kanai et al. |
| 2009/0316183 A1 | 12/2009 | Wei |
| 2010/0002249 A1 | 1/2010 | Nuggehalli et al. |
| 2010/0253968 A1 | 10/2010 | Nuggehalli |
| 2010/0265529 A1 | 10/2010 | Katano |
| 2011/0013219 A1 | 1/2011 | Nuggehalli et al. |
| 2012/0002234 A1 | 1/2012 | Wang |

FOREIGN PATENT DOCUMENTS

| | | |
|---|---|---|
| EP | 1229724 A2 | 8/2002 |
| EP | 1 465 052 A2 | 10/2004 |
| EP | 1621994 A1 | 2/2006 |
| JP | 4235667 A | 8/1992 |
| JP | H06-095464 | 8/1994 |
| JP | 10207660 A | 8/1998 |
| JP | 2001125982 A | 5/2001 |
| JP | 2001217948 A | 8/2001 |
| JP | 2002007095 A | 1/2002 |
| JP | 2002175241 A | 6/2002 |
| JP | 2004287824 | 10/2004 |
| JP | 2005074772 A | 3/2005 |
| JP | 2005092731 | 4/2005 |
| JP | 2005178070 A | 7/2005 |
| JP | 2008-97115 | 4/2008 |

OTHER PUBLICATIONS

U.S. Appl. No. 12/417,846, filed Apr. 3, 2009, Office Action, mailed Jan. 11, 2012.

U.S. Appl. No. 12/417,846, filed Apr. 3, 2009, Office Action, mailed Mar. 1, 2012.

U.S. Appl. No. 11/656,592, filed Jan. 22, 2007, Final Office Action, mailed Feb. 28, 2012.

U.S. Appl. No. 11/880,359, filed Jul. 20, 2007, Office Action, mailed Apr. 4, 2012.

U.S. Appl. No. 13/230,541, filed Sep. 21, 2011, Final Office Action, mailed Apr. 25, 2012.

U.S. Appl. No. 13/396,401, filed Feb. 14, 2012, Office Action, mailed May 7, 2012.

* cited by examiner

PERFORMANCE OF A LOCKED PRINT ARCHITECTURE

FIELD OF THE INVENTION

This invention relates generally to locked printing on printing devices.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Some printing devices are configured with a feature known as "locked printing" to provide control over the printing of electronic documents. When a printing device is configured with a locked printing feature and print data is sent to the printing device, a printed version of an electronic document reflected in the print data is not generated until a password is verified at the printing device. Typically a user enters a password through an operation panel on the printing device. The printing device verifies the password and if the password is successfully verified, allows a printed version of the electronic document reflected in the print data to be generated, i.e., printed.

The locked printing feature may entail encrypting the print data, compressing the print data, and storing encrypted and compressed print data in non-volatile media. Implementing this feature in a platform-independent programming language, such as the Java programming language (herein "Java"), causes the steps of encrypting, compressing, decompressing, and decrypting to be performed relatively slow compared to implementing the locked printing feature in a platform-dependent programming language, such as the C programming language (herein "C"). However, there are sufficient reasons for implementing the user interface (e.g., on the printing device), which accepts user input, in a platform-independent programming language, such as Java. Therefore, there is a need to combine the benefits of implementing the locked printing feature in relatively fast programming language with the benefits of implementing the user interface in a program-independent programming language.

SUMMARY

Techniques are provided for processing a print job at a printing device. A printing device receives a print job that includes print data and a lock indication. The printing device includes a printing module that is configured to process the print data and cause an electronic document reflected in the print data to be printed on a tangible medium. In response to receiving the print job and identifying the lock indication, the print data is encrypted and durably stored. A user is authenticated based on authentication information received from the user. After authenticating the user, a user interface module of the printing device, processes user input that identifies a selection of the print job. The user interface module is developed in a platform-independent programming language, such as Java.

An inter-process communication channel is established between the user interface module and a job print module of the printing device. The job print module is developed in a platform-dependent programming language, such as C. In response to receiving the user input, the user interface module sends, to the job print module via the inter-process communication channel, one or more instructions to decrypt the print data and to generate a printed version of the electronic document reflected in the print data.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Techniques are provided for processing a print job. A printing device comprises multiple modules that are developed in different programming languages. An inter-process communication channel is established between (a) a first module that is developed in a platform-independent programming language and (b) one or more second modules that are developed in a platform-dependent programming language. The inter-process communication channel allows for inter-process communication between the various modules. The first module receives user input that identifies a particular print job. In response to the user input, the first module sends, via the inter-process communication channel, instructions to one or more second modules, which retrieves the print job, decrypts the print job, and causes a printed version of an electronic document reflected in the print data of the print job to be printed.

Although the following description refers to a Java application and a C application communicating with each other, embodiments of the invention are applicable to an application developed in any platform-independent programming language (e.g., Python) communicating with another application developed in any platform-dependent programming language (e.g., an assembly language).

Also, although the following description refers to a print service executing a print job, embodiments of the invention are also applicable to other services (e.g., provided by a multi-function peripheral or MFP) executing other types of jobs. For example, a scan service executes scan jobs; a fax service executes fax jobs, a copy service executes copy jobs, and an archive service executes archive jobs. All of these services may be implemented on one MFP.

Locked Print Architecture

Figure 1:
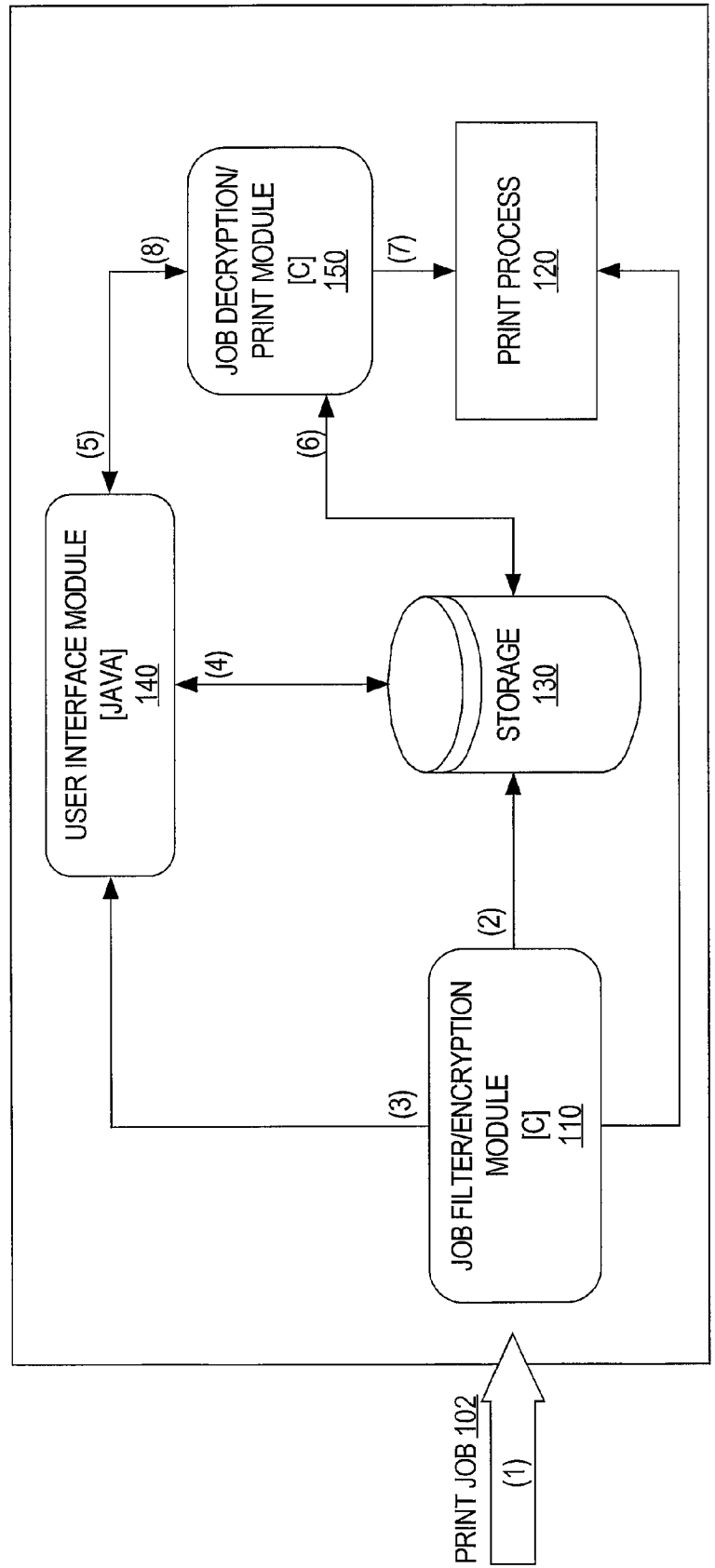
FIG. 1 is a block diagram that depicts an example lock printing architecture, according to an embodiment of the invention.

FIG. 1 is a block diagram that depicts an example locked print architecture 100, according to an embodiment of the invention. Locked print architecture (LPA) 100 comprises several components for processing a print job 102. LPA 100 comprises a job filter/encryption module 110 (referred to herein as "job filter module 110"), a print process 120, storage 130, a user interface (UI) module 140, and a job decryption/print module 150 (referred to herein as "job print module 150"). Storage 130 may be a volatile medium, a non-volatile medium, or any combination of volatile and non-volatile media. Storage 130 may be part of the printing device that processes print job 102 or may be separate from the printing device.

Job filter module 110, UI module 140, and job print module 150 may be implemented as computer software or any combination of computer software and computer hardware.

Each component depicted in FIG. 1 is described hereinafter in one method for processing print job 102. Embodiments of the invention are not limited to these particular components, nor to the particular steps of the described method. For example, some steps are not required, the steps may be performed in a different order, some components may be combined, and some components may be divided into multiple components.

The arrows in FIG. 1 refer to transfers of data from one module or device to another module or device. The transfers of data include a print job, requests, and other types of messages. Each transfer of data is depicted (and referred to herein) with a number surrounded by parentheses "( )." Although each arrowhead in FIG. 1 indicates a flow of data in one direction, embodiments of the invention are not limited to only that direction.

Locked Print Architecture: Job Filter Module and Print Process

As indicated in FIG. 1, job filter module 110 is developed in a platform-dependent programming language, such as C. Job filter module 110 receives (1) print job 102. Although not depicted in FIG. 1, there may be one or more software/hardware modules that process print job 102 before print job is processed by job filter module 110.

Print job 102 includes print data and other information, such as a job identifier, a job name, a user identifier, password information, a size of the print data, and a page count of an electronic document that is reflected in the print data.

Job filter module 110 determines whether print job 102 should be immediately processed by print process 120 (e.g., without encrypting and storing print job 102). If so, then job filter module 110 sends print job 102 to print process 120.

Print process 120 may be implemented as computer hardware, computer software, or any combination of computer hardware and computer software. Print process 120 causes a printed version of an electronic document reflected in print data of print job 102 to be printed on a tangible medium, such as paper.

The determination of whether to send print job 102 to print process 120 for processing may be made based on a lock indication in print job 102. The lock indication in print job 102 indicates the print data of print job 102 is to be processed as locked print data. In one example, the existence of password information in print job 102 may serve as the lock indication. If print job 102 does not include a lock indication, then the print data of print job 102 is not to be processed as locked print data. For example, print job 102 would be processed with other print jobs in the order in which the print jobs were received. Alternatively, if print job 102 includes a lock indication, then job filter module 110 sends (2) print job 102 to storage 130 rather than to print process 120.

Prior to sending (2) print job 102 to storage 130, job filter module 110 encrypts print job 102. In an embodiment, job filter module 110 also compresses the encrypted version of print job 102. The steps of encrypting and compressing may be performed by job filter module 110 invoking one or more library routines. Embodiments of the invention are not limited to any particular encryption technique or any particular compression technique. Job filter module 110 causes (2) print job 102 to be stored in storage 130.

Figure 2:
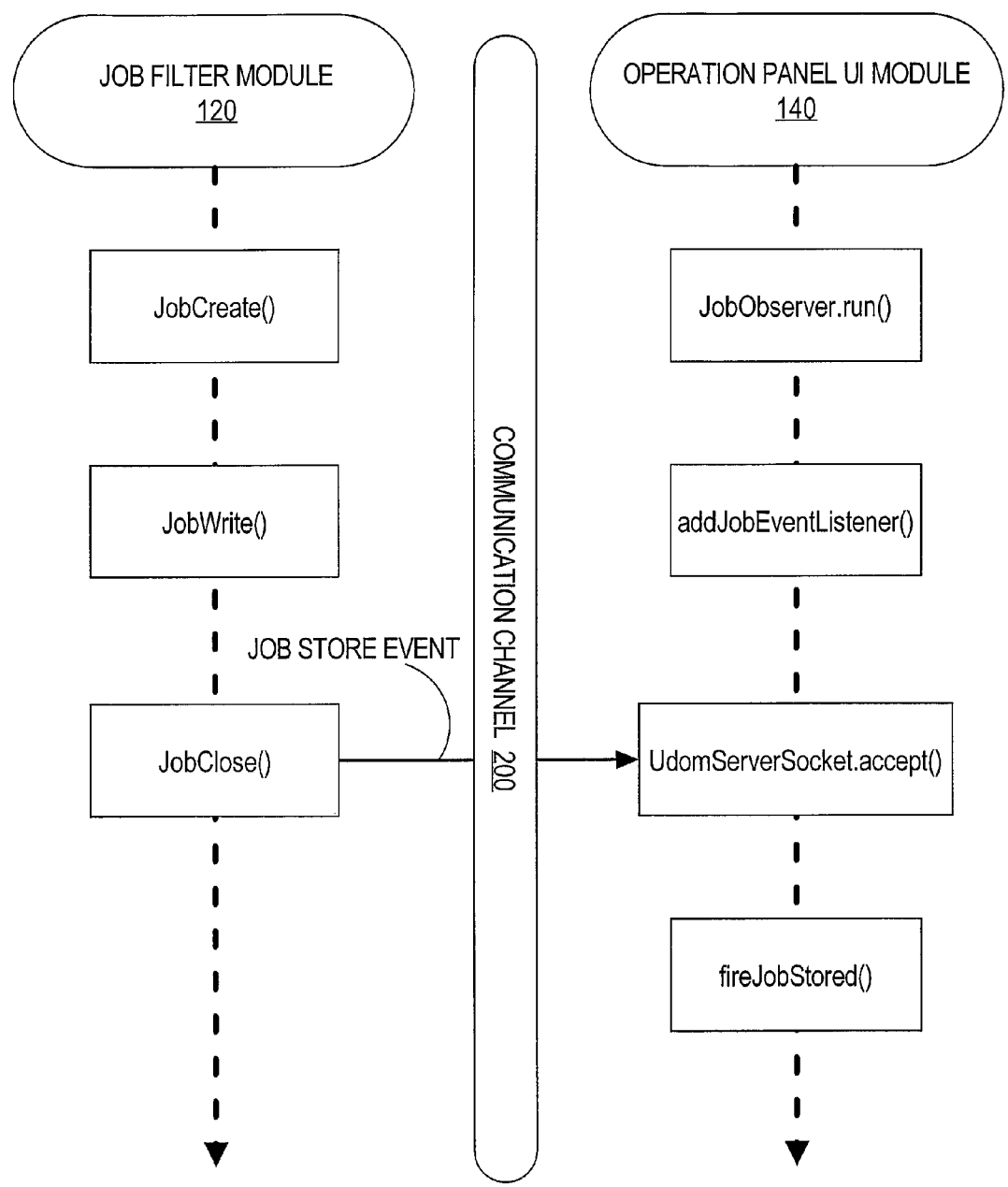
FIG. 2 is a sequence diagram that depicts a C application communicating with a Java application, according to an embodiment of the invention.

Locked Print Architecture: User Interface Module and Inter-Process Communication Channel In an embodiment, if job filter module 110 successfully encrypts and stores print job 102 in storage 130, then job filter module 110 sends (3) an event notification to UI module 140, which is developed in Java. This event notification process is depicted in the sequence diagram of FIG. 2. According to FIG. 2, job filter module 110 calls a JobCreate( ) function and a JobWrite( ) function. Execution of these functions cause the encrypting and storing steps, described above, to be performed. Job filter module 110 then calls a JobClose( ) function. This function entails job filter module 110 sending, via a inter-process communication channel 200, a job store event to UI module 140. Inter-process communication channel 200 may be established either (a) before the JobCreate( ) function is even called or (b) in response to calling the JobClose( ) function.

Inter-process communication channel 200 may be any mechanism that allows for inter-process communication between modules that were developed in different programming languages. For example, inter-process communication channel 200 may be a Unix Domain (UDOM) socket interface. As another example, inter-process communication channel 200 may be shared memory to which both job filter module 110 and UI module 140 have access.

Before UI module 140 receives the job store event, UI module 140 calls a JobObserver.run( ) function and an addJobEventListener( ) function to listen for events, such as the job store event. In response to receiving the job store event via inter-process communication channel 200, UI module 140 calls a UdomServerSocket.accept( ) function, which formally accepts the job store event. UI module 140 then calls a fireJobStored( ) function, which causes an operation panel of the printing device to visually display information that indicates that print job 102 was successfully stored.

This event notification communication between job filter module 110 and UI module 140 is not required. This event notification communication may be implemented or enabled only in limited circumstances, depending on the needs of the end users.

Locked Print Architecture: User Authentication

Some time later, the user that initiated print job 102 (or some other authorized user) accesses the printing device and authenticates him/herself. User authentication may be performed by any means. For example, the user may enter a card into the printing device. The printing device then reads the card and authenticates the user based on authentication information encoded on the card. As another example, the user is visually prompted, e.g., via a user interface on the printing device, to enter a username and password that are used to authenticate the user.

In either case, UI module 140 (or some other associated module) compares the authentication information received from the user with authentication information retrieved (4) from storage 130 (or some other durable storage).

In response to successfully authenticating the user, the printing device visually displays, e.g., via UI module 140, a list of one or more print jobs that the user is allowed to access. Print job 102 should be referenced in the list. In response to receiving a user selection of a reference to print job 102, UI module 140 sends (5) a request to job print module 150. The request includes information that identifies print job 102.

Locked Print Architecture: Job Print Module

Figure 3:
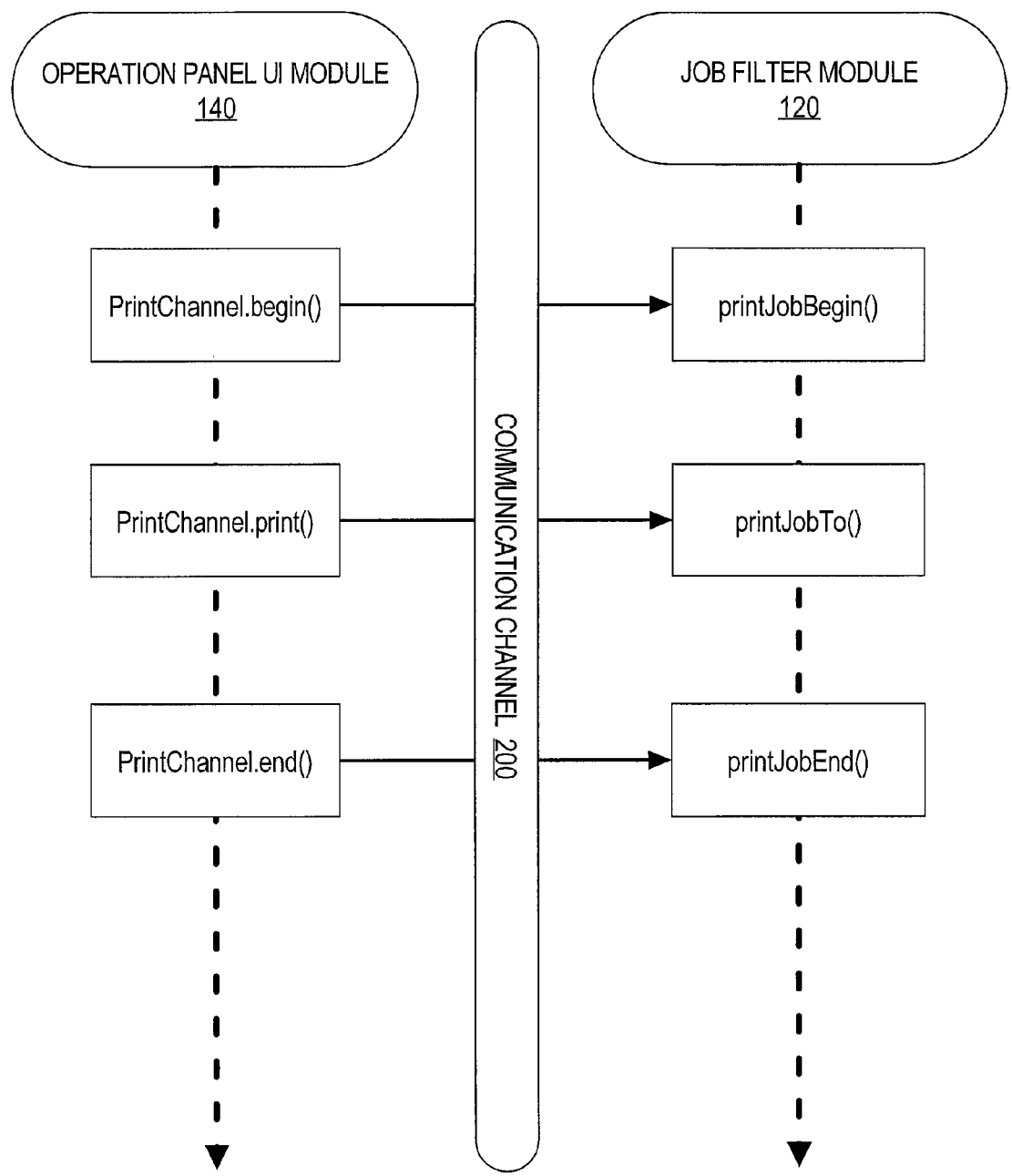
FIG. 3 is a sequence diagram that depicts a Java application communicating with a C application, according to an embodiment of the invention.

As indicated in FIG. 1, job print module is developed in C. Therefore, in order for UI module 140 to send (5) the request to job print module 150, a inter-process communication channel must be established between UI module 140 and job print module 150. This inter-process communication channel is depicted as inter-process communication channel 200 in FIG. 3. As depicted in FIG. 3, UI module 140 calls a PrintChannel.begin( ) function, a PrintChannel.print( ) function, and a PrintChannel.end( ) function. Inter-process communication channel 200 may be established in response to the calling of PrintChannel.begin( ) function or sometime long before that function call.

The PrintChannel.begin( ) function causes data to be sent, via inter-process communication channel 200, to job print module 150, which calls a printJobBegin( ) function in response. The data that is sent as a result of the PrintChannel.begin( ) function call may comprise a command identifier that identifies the command as a "Begin" command, an indication of the number of bytes that follow, an IP address of the printing device, and a port number that identifies a port of print process 120 The printJobBegin( ) function (i.e., called by job print module 150) causes a socket connection between job print module 150 and print process 120 to be established based on the port number.

The PrintChannel.print( ) function causes data to be sent, via inter-process communication channel 200, to job print module 150, which calls a printJobTo( ) function in response. The data that is sent as a result of the PrintChannel.print( ) function call may comprise a command identifier that identifies the command as a "Print" command, an indication of the number of bytes that follow, the size of print job 102, and an identifier of print job 102. The printJobTo( ) function (i.e., called by job print module 150) causes job print module 150 to retrieve (6) the encrypted and compressed print job 102 from storage 130, decompress and decrypt the print data of print job 102, and write (7) the print data to the print port of print process 120 via the socket connection.

The PrintChannel.end( ) function causes data to be sent, via inter-process communication channel 200, to job print module 150, which calls a printJobEnd( ) function in response. The data that is sent as a result of the PrintChannel.end( ) function call may comprise a command identifier that identifies the command as a "End" command and an indication of the number of bytes that follow, which may be 0 in this case. The printJobEnd( ) function (i.e., called by job print module 150) causes the socket connection between job print module 150 and print process 120 to close.

If a user selects multiple print jobs to be executed, then each print job may be uniquely identified in a single PrintChannel.print( ) function call. Alternatively, UI module 140 calls the PrintChannel.print( ) function for each print job. After all the print jobs are executed, operational panel UI module 140 calls the PrintChannel.end( ) function.

Job print module 150 may send (8), via inter-process communication channel 200, an acknowledgement (not shown in FIG. 3) to UI module 140 after each function call. The acknowledgement indicates whether the corresponding function call was successfully executed. For example, after job print module 150 successfully establishes a socket connection with print process 120, job print module 150 sends an acknowledgement message to operation panel UI module indicating such. An acknowledgement message may comprise a response identifier that identifies the message as an acknowledgement, an indication of the number of bytes that follow, an indication (e.g., either 0 or 1) of the whether the function call was successful, and an error string, if any.

Group of Printing Devices

In an embodiment, although print job 102 is sent to a particular printing device, print job 102 may be executed by any printing device in a group to which the particular printing device belongs. Thus, the list of print jobs that are stored on any particular printing device in a group is shared among each printing device in the group.

In response to receiving selection information of a particular print job, the user interface module of a first printing device sends a request to a second printing device that stores the particular print job. The second printing device may decrypt the encrypted print data before sending the particular print job to the first printing device. Alternatively, the second printing device sends the particular print job to the first printing device, which decrypts the print data. In either case, the first printing device executes the print job even though the print job was sent to and stored at a second printing device.

Benefits of embodiments of the invention is that a printing device can take advantage of (a) user interface modules developed in a platform-independent (and higher level) language and (b) encryption and decryption modules developed in a platform-dependent (and lower level) language, which modules execute must faster than their platform-independent counterparts.

Event Notification: Other Contexts

Embodiments of the invention are also applicable to other device and/or services. For example, a facsimile (fax) device generates a printed version of an electronic document reflected in fax data of a fax job. A fax device includes multiple modules, such as a UI module and a job fax module. The UI module is developed in a platform-independent programming language and the job fax module is developed in a platform-dependent programming language. In response to receiving a fax job or to generating a printed version of a fax job, the fax job module sends, via an inter-process communication channel established between the fax job module and the UI module, an event message that indicates that the fax job is received or that the printed version is generated. In response to receiving the event message, the UI module causes an operation panel of the fax device to visually display that the particular event occurred, whether the event is a fax received event or a fax printed event.

Implementation Mechanisms

Figure 4:
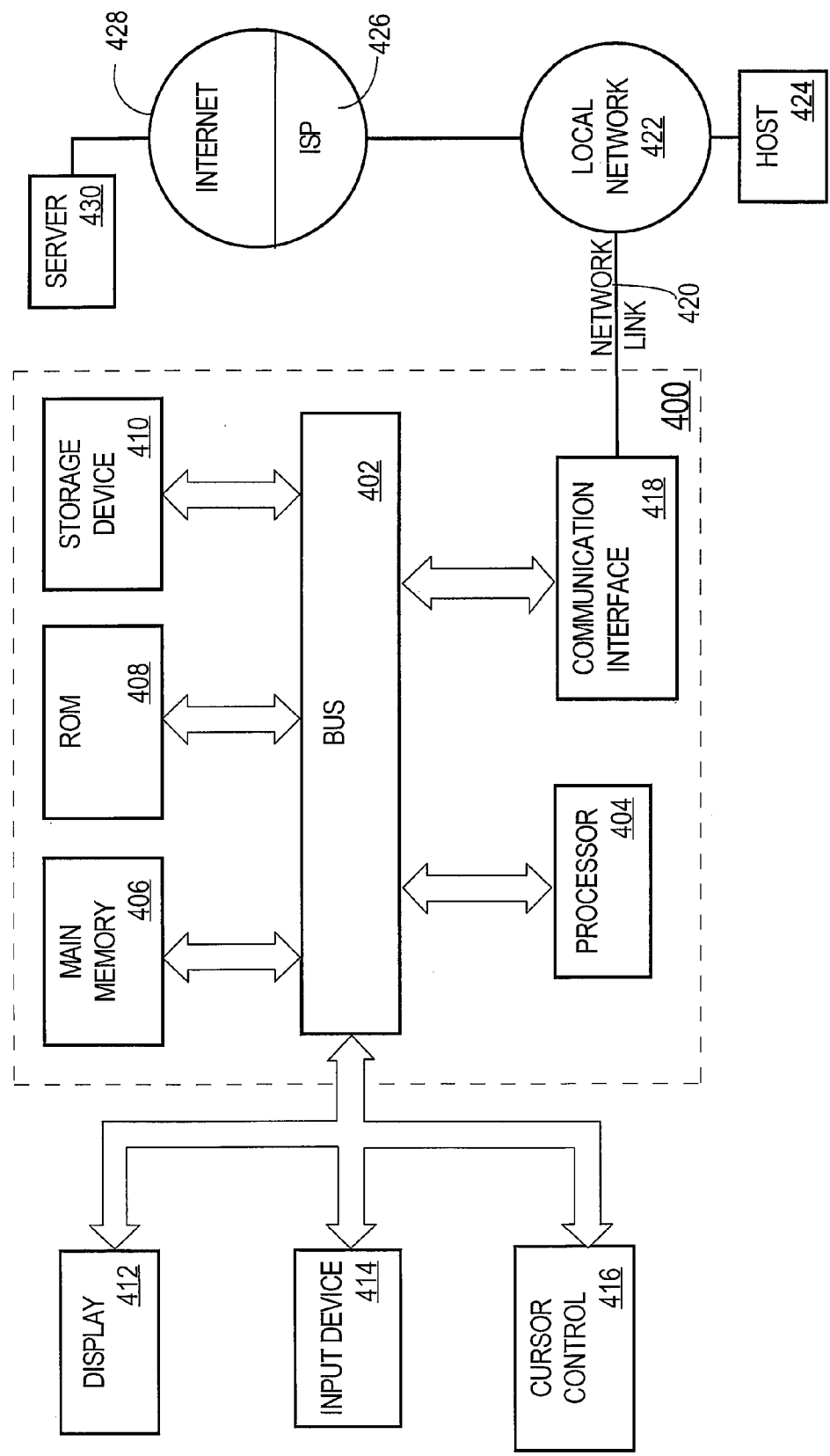
FIG. 4 is a block diagram that depicts a computer system 400 upon which an embodiment of the invention may be implemented.

FIG. 4 is a block diagram that depicts a computer system 400 upon which an embodiment of the invention may be implemented. Computer system 400 includes a bus 402 or other communication mechanism for communicating information, and a processor 404 coupled with bus 402 for processing information. Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

The invention is related to the use of computer system 400 for implementing the techniques described herein. According to one embodiment of the invention, those techniques are performed by computer system 400 in response to processor 404 executing one or more sequences of one or more instructions contained in main memory 406. Such instructions may be read into main memory 406 from another machine-readable medium, such as storage device 410. Execution of the sequences of instructions contained in main memory 406 causes processor 404 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 400, various machine-readable media are involved, for example, in providing instructions to processor 404 for execution. Such a medium may take many forms, including but not limited to storage media and transmission media. Storage media includes both non-volatile media and volatile media. Non-volatile media includes, for example, optical or magnetic disks, such as storage device 410. Volatile media includes dynamic memory, such as main memory 406. Transmission media includes coaxial cables, copper wire and fiber optics, including the wires that comprise bus 402. Transmission media can also take the form of acoustic or light waves, such as those generated during radio-wave and infra-red data communications. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution. In this manner, computer system 400 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A network device comprising:
a user interface that is configured to receive user input;
a user interface module that is configured to process the user input and that is developed in a platform-independent programming language;
a job processing module that is developed in a platform-dependent programming language; and
a print process that is configured to process particular print data and cause one or more electronic documents reflected in the particular print data to be printed on a tangible medium;
wherein the network device is configured to perform the steps of:
    establishing an inter-process communication channel between the user interface module of the network device and the job processing module of the network device, wherein the user interface module is developed in the platform-independent programming language, wherein the job processing module is developed in the platform-dependent programming language; and
    receiving, at the network device via a network, a job that includes electronic data, wherein the network device includes one or more modules that are configured to generate a printed version of an electronic document reflected in the electronic data;
    while processing the job, sending one or more messages between the job processing module and the user interface module via the inter-process communication channel;
    wherein sending the one or more messages comprises:
        the user interface module calling a first function that causes the job processing module to establish a connection between the job processing module and the print process to be established;
        the user interface module calling a second function that causes the job processing module to write print data to a port of the print process;
        the user interface module calling a third function that causes the job processing module to close the connection.

2. The network device of claim 1, wherein the platform-independent programming language is the Java programming language and the platform-dependent programming language is the C programming language.

3. The network device of claim 1, wherein:
the network device is a printing device;
the job processing module is a job print module;
the job is a print job;
the electronic data includes print data;
the printing device is further configured to perform the steps of:
    in response to receiving the print job and identifying a lock indication associated with the print job, encrypting the first print data and storing the encrypted print data;
    authenticating a user based on authentication information received from the user; and
    after authenticating the user, receiving, at the user interface, the user input, wherein the user input identifies a selection of the print job; and
wherein the user interface module is further configured to perform the step of, in response to receiving the user input, sending, to the job print module via the inter-process communication channel, one or more instructions to decrypt the print data and to cause a printed version of an electronic document reflected in the print data to be generated.

4. The network device of claim 3, wherein the job print module is configured to decrypt the print data and cause the printed version to be generated.

5. The network device of claim 4, wherein the job print module being configured to cause the printed version to be generated includes the job print module being configured to send the print job to the print process.

6. The network device of claim 3, further comprising a job storage module that is configured to store the print data, wherein:
the job storage module is developed in the platform-dependent programming language; and
the network device is further configured to perform the steps of:
    establishing a first inter-process communication channel between the job storage module and the user interface module;
    in response to storing the print data, the job storage module sending, to the user interface module via the first inter-process communication channel, an event that indicates that the print data has been stored; and
    in response to receiving the event, the user interface module displaying, via a user interface, event information that indicates the occurrence of the event.

7. The network device of claim 3, wherein the printing device is further configured to perform the step of:
compressing the encrypted print data before storing the encrypted print data, wherein the one or more instructions include one or more additional instructions to decompress the compressed print data.

8. The network device of claim 1, wherein:
the network device is a facsimile (fax) device;
the job processing module is a job fax module;
the job is a fax job; and
sending the one or more messages includes:
    in response to receiving the fax job, the job fax module sending, to the user interface module via the inter-process communication channel, one or more event messages that indicate that the fax job has been received;
    in response to receiving the one or more event messages, the user interface module causing a user interface display, of the facsimile device, to display information that the fax job has been received.

9. One or more non-transitory machine-readable storage media carrying instructions which, when executed by one or more processors, cause:
establishing an inter-process communication channel between a user interface module of a network device and a job processing module of the network device, wherein the user interface module is developed in a platform-independent programming language, wherein the job processing module is developed in a platform-dependent programming language; and
receiving, at the network device via a network, a job that includes electronic data, wherein the network device includes one or more modules that are configured to generate a printed version of an electronic document reflected in the electronic data;

while processing the job, sending one or more messages between the job processing module and the user interface module via the inter-process communication channel;

wherein sending the one or more messages comprises:
the user interface module calling a first function that causes the job processing module to establish a connection between the job processing module and a print process to be established, wherein the print process is configured to process print data and cause one or more electronic documents reflected in the print data to be printed on a tangible medium;

the user interface module calling a second function that causes the job processing module to write print data to a port of the print process;

the user interface module calling a third function that causes the job processing module to close the connection.

10. The one or more non-transitory machine-readable storage media of claim 9, wherein the platform-independent programming language is the Java programming language and the platform-dependent programming language is the C programming language.

11. The one or more non-transitory machine-readable storage media of claim 9, wherein:
the network device is a printing device;
the job processing module is a job print module;
the job is a print job;
the electronic data includes print data;
the instructions include additional instructions which, when executed by the one or more processors, further cause:
in response to receiving the print job and identifying a lock indication associated with the print job, encrypting the print data and storing the encrypted print data;
authenticating a user based on authentication information received from the user; and
after authenticating the user, receiving, at a user interface of the printing device, user input that identifies a selection of the print job; and
sending the one or more messages includes, in response to receiving the user input, the user interface module sending, to the job print module via the inter-process communication channel, one or more instructions to decrypt the print data and to cause a printed version of the electronic document reflected in the print data to be generated.

12. The one or more non-transitory machine-readable storage media of claim 11, wherein the instructions include additional instructions which, when executed by the one or more processors, further cause:
the job print module decrypting the print data; and
the job print module causing the printed version to be generated.

13. The one or more non-transitory machine-readable storage media of claim 12, wherein the job print module causing the printed version to be generated includes sending the print job to a print process of the printing device.

14. The one or more non-transitory machine-readable storage media of claim 11, wherein:
a job storage module performs the step of storing the print data;
the job storage module is developed in the platform-dependent programming language; and the instructions include additional instructions which, when executed by the one or more processors, further cause:
establishing a first inter-process communication channel between the job storage module and the user interface module;
in response to storing the print data, the job storage module sending, to the user interface module via the first inter-process communication channel, an event that indicates that the print data has been stored in the non-volatile storage; and
the user interface module displaying, via a user interface, event information that indicates the occurrence of the event.

15. The one or more non-transitory machine-readable storage media of claim 11, wherein the instructions include additional instructions which, when executed by the one or more processors, further cause:
compressing the encrypted print data before durably storing the encrypted print data, wherein the one or more instructions include one or more additional instructions to decompress the compressed print data.

16. The one or more non-transitory machine-readable storage media of claim 9, wherein:
the network device is a facsimile (fax) device;
the job processing module is a job fax module;
the job is a fax job; and
sending the one or more messages includes:
in response to receiving the fax job, the job fax module sending, to the user interface module via the inter-process communication channel, one or more event messages that indicate that the fax job has been received;
in response to receiving the one or more event messages, the user interface module causing a user interface display, of the facsimile device, to display information that the fax job has been received.

17. A method comprising:
establishing an inter-process communication channel between a user interface module of a network device and a job processing module of the network device, wherein the user interface module is developed in a platform-independent programming language, wherein the job processing module is developed in a platform-dependent programming language; and
receiving, at the network device via a network, a job that includes electronic data, wherein the network device includes one or more modules that are configured to generate a printed version of an electronic document reflected in the electronic data;
while processing the job, sending one or more messages between the job processing module and the user interface module via the inter-process communication channel;
wherein sending the one or more messages comprises:
the user interface module calling a first function that causes the job processing module to establish a connection between the job processing module and a print process to be established, wherein the print process is configured to process print data and cause one or more electronic documents reflected in the print data to be printed on a tangible medium;
the user interface module calling a second function that causes the job processing module to write print data to a port of the print process;

the user interface module calling a third function that causes the job processing module to close the connection.

18. The method of claim 17, wherein:
the network device is a printing device;
the job processing module is a job print module;
the job is a print job;
the electronic data includes print data;
the method further comprising:
- in response to receiving the print job and identifying a lock indication associated with the print job, encrypting the print data and storing the encrypted print data;
- authenticating a user based on authentication information received from the user; and
- after authenticating the user, receiving, at a user interface of the printing device, user input that identifies a selection of the print job; and sending the one or more messages includes, in response to receiving the user input, the user interface module sending, to the job print module via the inter-process communication channel, one or more instructions to decrypt the print data and to cause a printed version of the electronic document reflected in the print data to be generated.

19. The method of claim 18, further comprising:
the job print module decrypting the print data; and
the job print module causing the printed version to be generated.

20. The method of claim 18, wherein:
a job storage module performs the step of storing the print data;
the job storage module is developed in the platform-dependent programming language; and
the method further comprising:
- establishing a first inter-process communication channel between the job storage module and the user interface module;
- in response to storing the print data, the job storage module sending, to the user interface module via the first inter-process communication channel, an event that indicates that the print data has been stored in the non-volatile storage; and
- the user interface module displaying, via a user interface, event information that indicates the occurrence of the event.

21. The method of claim 18, further comprising:
compressing the encrypted print data before durably storing the encrypted print data, wherein the one or more instructions include one or more additional instructions to decompress the compressed print data.

22. The method of claim 17, wherein:
the network device is a facsimile (fax) device;
the job processing module is a job fax module;
the job is a fax job; and
sending the one or more messages includes:
- in response to receiving the fax job, the job fax module sending, to the user interface module via the inter-process communication channel, one or more event messages that indicate that the fax job has been received;
- in response to receiving the one or more event messages, the user interface module causing a user interface display, of the facsimile device, to display information that the fax job has been received.

* * * * *